US011432917B2

(12) United States Patent
Koo (10) Patent No.: US 11,432,917 B2
(45) Date of Patent: Sep. 6, 2022

(54) DENTAL SUCTION ASSISTING DEVICE (71) Applicant: DENTOZONE CO., LTD., Seoul (KR)

(72) Inventor: Cha Hyoung Koo, Seoul (KR)

(73) Assignee: DENTOZONE CO., LTD., Seoul (KR)

( * ) Notice: Subject to any disclaimer, the term of this patent is extended or adjusted under 35 U.S.C. 154(b) by 0 days.

(21) Appl. No.: 17/085,073

(22) Filed: Oct. 30, 2020

(65) Prior Publication Data

US 2021/0386534 A1 Dec. 16, 2021

(30) Foreign Application Priority Data

Jun. 16, 2020 (KR) .................. 10-2020-0073279

(51) Int. Cl.
*A61C 17/10* (2006.01)
*A61C 17/08* (2006.01)

(52) U.S. Cl.
CPC .............. *A61C 17/10* (2019.05); *A61C 17/08* (2019.05)

(58) Field of Classification Search
CPC ............ A61C 17/08; A61C 17/10; A61B 1/24
See application file for complete search history.

(56) References Cited

U.S. PATENT DOCUMENTS

| 3,924,333 A | * | 12/1975 | Erickson | A61C 17/08 433/93 |
| 4,167,814 A | * | 9/1979 | Schubert | A61C 17/08 433/93 |
| 4,802,851 A | * | 2/1989 | Rhoades | A61C 17/08 433/140 |
| 4,975,057 A | * | 12/1990 | Dyfvermark | A61B 1/24 433/91 |
| 5,466,153 A | * | 11/1995 | Poindexter | A61C 17/08 433/140 |
| 5,588,836 A | * | 12/1996 | Landis | A61C 17/08 433/93 |
| 5,655,519 A | * | 8/1997 | Alfery | A61M 16/0488 128/207.14 |
| 6,241,521 B1 | * | 6/2001 | Garrison | A61B 1/24 433/140 |

(Continued)

FOREIGN PATENT DOCUMENTS

EP 3 167 843 A1 5/2017
JP 2006-034305 A 2/2006

(Continued)

*Primary Examiner* — Ralph A Lewis
(74) *Attorney, Agent, or Firm* — The PL Law Group, PLLC (57) ABSTRACT A dental suction assisting device includes an upper molar seat located at an upper portion of a body and having anti-separation protrusions and a space for allowing seating of upper molars, a lower molar seat located at a lower portion of the body and having anti-separation protrusions and a space for allowing seating of lower molars, a fastening portion having an insertion hole and a through-hole and allowing fastening of a suction tube, a suction port having a first suction hole and allowing secretions in an oral cavity to be sucked through the suction tube, a leg formed at each side of the lower molar seat, configured such that the respective legs are brought into intimate contact with opposite side surfaces of the lower molars and having partitions, and a wing extending from the leg, and seated between the lower molars and skin in the oral cavity.

9 Claims, 4 Drawing Sheets (56) References Cited

U.S. PATENT DOCUMENTS

| | | | | |
|---|---|---|---|---|
| 6,244,866 | B1* | 6/2001 | Campbell | A61B 1/24 |
| | | | | 433/140 |
| 6,974,321 | B2* | 12/2005 | Hirsch | A61C 17/10 |
| | | | | 433/140 |
| 8,870,568 | B1* | 10/2014 | Ream | A61C 17/08 |
| | | | | 433/93 |
| 9,968,341 | B2* | 5/2018 | Ritter | A61C 1/088 |
| 2003/0134253 | A1* | 7/2003 | Hirsch | A61C 5/90 |
| | | | | 433/29 |

FOREIGN PATENT DOCUMENTS

| KR | 10-2012-0140028 A | 12/2012 |
|---|---|---|
| KR | 10-2013-0039439 A | 11/2013 |
| KR | 10-1800377 B1 | 11/2017 |
| KR | 10-1907176 B1 | 10/2018 |

* cited by examiner

DENTAL SUCTION ASSISTING DEVICE

CROSS REFERENCE TO RELATED APPLICATION

The present application claims priority to Korean Patent Application No. 10-2020-0073279, filed Jun. 16, 2020, the entire contents of which is incorporated herein for all purposes by this reference.

BACKGROUND

Field of the Invention

The present disclosure relates generally to a dental suction assisting device and, more particularly, to a dental suction assisting device that allows a dentist to perform dental treatment without an assistant.

Description of the Related Art

In dental treatment, a dental suction device, which is an essential device, is used to remove saliva, foreign substances, blood, etc. generated in a patient's oral cavity during the treatment process.

An example of such a dental suction device includes a suction module in which a replaceable suction tip inserted into the patient's oral cavity is installed. In typical dental treatment, a dental assistant is required to assist a dentist so that the suction tip is placed in an appropriate position in the patient's oral cavity while holding the suction module by hand.

However, due to the recent trend toward miniaturization of dental clinics, a one-person dental clinic where a dentist performs treatments alone without the help of dental assistants has become an issue in the dental industry.

Meanwhile, in order for a dentist to be able to perform dental treatment alone, the work of a dental assistant who operates the suction module is required to be replaced. In an effort to solve this, a dental suction assisting device disclosed in Korean Patent No. 10-1907176 has been proposed, and a description referring to Korean Patent No. 10-1907176 will be given in detail as follows.

The dental suction assisting device disclosed in Korean Patent No. 10-1907176 includes: a gripper for gripping a suction module inserted in a patient's oral cavity; an adjuster coupled to the gripper and adjusting the position of the suction module in the patient's oral cavity; and a support coupled to the adjuster to support the adjuster, wherein the adjuster includes a first adjuster coupled to the support and being plastically deformable, a second adjuster coupled to the first adjuster and driven by a hinge method, and a third adjuster coupled to the second adjuster and driven by a ball bearing method, wherein the first adjuster includes a rigid portion, which is a rigid coil structure having a first end connected to an upper end of the support, and a flexible portion, which is a flexible coil structure having a first end coupled to a second end of the rigid portion and a second end coupled to the second adjuster.

However, according to Korean Patent No. 10-1907176, there is a financial problem in that a dentist needs to purchase expensive equipment (suction module) in order to perform dental treatment without an assistant, and the dentist needs to perform the treatment while simultaneously holding the suction module, which is cumbersome.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a dental suction assisting device that allows a dentist to perform dental treatment without an assistant.

In order to achieve the above objective, according to one aspect of the present disclosure, there is provided a dental suction assisting device, including: an upper molar seat located at an upper portion of a body made of a soft material, and having anti-separation protrusions arranged at a regular interval and a space for allowing seating of upper molars; a lower molar seat located at a lower portion of the body, and having anti-separation protrusions arranged at a regular interval and a space for allowing seating of lower molars; a fastening portion having an insertion hole and a through-hole formed between the upper molar seat and the lower molar seat, and protruding outward from a side of the insertion hole so as to allow fastening of a suction tube; a suction port formed at a position opposite to the fastening portion, having a first suction hole formed therein to be connected to the through-hole, and protruding outward so as to allow secretions including saliva secreted into an oral cavity to be sucked through the suction tube; a leg formed at each of opposite sides of the lower molar seat, and configured such that the respective legs are brought into intimate contact with opposite side surfaces of the lower molars, the leg having partitions arranged at a regular interval; and a wing extending from a side of the leg, and seated between the lower molars and skin in the oral cavity.

Furthermore, the dental suction assisting device may further include: a support formed in a partition shape at each of opposite sides of the upper molar seat, and configured such that the respective supports are brought into intimate contact with opposite side surfaces of the upper molars thereby allowing the body to be fixed in place to the upper molars.

Furthermore, the dental suction assisting device may further include fixing protrusions arranged at a regular interval on an inner circumferential surface of the insertion hole so that the suction tube is inserted into the fastening portion even if a diameter of the suction tube varies, wherein at least two fixing protrusions may be formed on the inner circumferential surface of the insertion hole.

Furthermore, the dental suction assisting device may further include a second suction hole formed between the through-hole and the first suction hole perpendicularly to the through-hole, and passing through toward the lower molar seat, wherein a sum of inner diameters of the first suction hole and the second suction hole may fall within a range of 0.9 to 1.1 times an inner diameter of the suction tube.

Furthermore, the partitions may include a first partition, a second partition, a third partition, and a fourth partition that are arranged at a regular interval on the leg, and the leg may further include: a first dividing portion located between the first partition and the second partition; a second dividing portion located between the second partition and the third partition; and a third dividing portion located between the third partition and a reference protrusion.

Furthermore, the third dividing portion may have first protrusions arranged at a regular interval, wherein when the secretions are sucked into the second suction hole, the secretions may be sucked through a gap formed between the first protrusions.

Furthermore, the wing may include: a second protrusion formed in the same direction as the partitions; and a third protrusion formed at a corner of the wing, wherein a gap may be formed between the second protrusion and the third protrusion, and the secretions may be sucked through the gap.

Furthermore, the dental suction assisting device may further include patterns formed at a regular interval on a lower end of the leg, with a predetermined gap formed at a point brought into intimate contact with the skin in the oral cavity, and configured to maximize suction efficiency when suction takes place from the fastening portion.

These solutions will be more clearly understood from the following detailed description when taken in conjunction with the accompanying drawings.

All terms or words used in the specification and claims have the same meaning as commonly understood by one of ordinary skill in the art to which the inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to the embodiment of the present disclosure, there is an advantage in that it is possible for a dentist to efficiently perform suction by fixing the suction assisting device between the upper and lower molars of the patient and by connecting the suction tube to the fastening portion, and in that it is possible for the dentist to perform dental treatment while simultaneously performing suction without the help of a dental assistant.

In addition, according to the embodiment of the present disclosure, the suction assisting device is configured to allow suction in a state in which the suction assisting device is inserted into the oral cavity of the patient while being held in hand of the dentist and then a suction device is inserted into the suction assisting device, and thus there is an advantage in that it is possible for the dentist to perform dental treatment without having to hold a separate suction device.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Specific aspects and specific technical features of the present disclosure will be more clearly understood from the following detailed description and one embodiment thereof taken in conjunction with the accompanying drawings.

Reference now should be made to the drawings, in which the same reference numerals are used throughout the different drawings to designate the same or similar components. In the following description, it is to be noted that, when the functions of conventional elements and the detailed description of elements related with the present disclosure may make the gist of the present disclosure unclear, a detailed description of those elements will be omitted.

Further, when describing the components of the present disclosure, terms such as first, second, A, B, (a), or (b) may be used. Since these terms are provided merely for the purpose of distinguishing the components from each other, they do not limit the nature, sequence, or order of the components. It should be understood that when one element is referred to as being "connected to" or "coupled to" another element, it can be directly coupled or connected to the other element or intervening elements may be present therebetween.

Hereinbelow, an exemplary embodiment of the present disclosure will be described in detail with reference to the accompanying drawings.

As illustrated in FIGS. 1 to 4, a dental suction assisting device according to an embodiment of the present disclosure is made of a soft material, and includes a body 100 and a leg 200, and the body 100 and the leg 200 may be integrally configured.

The body 100 may include an upper molar seat 130 located at an upper portion thereof and having a space for allowing seating of upper molars, and a lower molar seat 170 located at a lower portion thereof and having a space for allowing seating of lower molars.

The upper molar seat 130 may be configured such that the space for allowing seating of the upper molars is provided, and anti-separation protrusions are arranged at a regular interval so that the molars are fixed in place to the upper molar seat 130.

In addition, the upper molar seat 130 may further include a support 131 formed in a partition shape at each of opposite sides thereof and configured to be brought into intimate contact with side surfaces of the upper molars. The respective supports 131 may be brought into intimate contact with opposite side surfaces of the molars, thereby allowing the body 100 to be fixed in place to the molars.

The lower molar seat 170 may be configured such that the space for allowing seating of the lower molars is provided, and anti-separation protrusions are arranged at a regular interval so that the molars are fixed in place to the lower molar seat 170.

In addition, the leg 200 may be formed on each of opposite sides of the lower molar seat 170, so that the same effect as the support 131 of the upper molar seat 130 may be expected.

An insertion hole 151 and a through-hole 155 may be formed between the upper molar seat 130 and the lower molar seat 170. A fastening portion 150 may be formed at a first side (e.g., the left side in FIG. 3) of the body 100, and a suction port 153 may be formed at a second side (e.g., the right side in FIG. 3) of the body 100.

In addition, the insertion hole 151 may be formed inside the fastening portion 150, a first suction hole 157 may be formed inside the suction port 153, and the through-hole 155 may be formed between the insertion hole 151 and the first suction hole 157. The insertion hole 151, the through-hole 155, and the first suction hole 157 may be configured to be connected to each other, thereby forming a shape that passes through the fastening portion 150 and the suction port 153.

In addition, fixing protrusions 151a may be arranged at a regular interval on an inner circumferential surface of the insertion hole 151 formed inside the fastening portion 150 so that a suction tube 21 provided externally is inserted into the fastening portion 150, and the fixing protrusions 151a may function to fix the suction tube 21 to the fastening portion 150.

Here, the insertion hole 151 may be provided to allow insertion of the suction tube 21, and the insertion hole 151 and the through-hole 155 may have different diameters (e.g., a structure in which there is a height difference between the insertion hole 151 and the through-hole 155) so that the suction tube 21 is prevented from being inserted into the through-hole 155 to prevent a second suction hole 159 which will be described later from being closed from the suction tube 21, thereby facilitating efficient suction.

The fixing protrusions 151a are formed in the same size and thickness at a regular interval in the insertion hole 151, but is not limited thereto, and may be provided in different sizes and thicknesses.

The suction tube 21 may be configured to be fixed through the fixing protrusions 151a. A separate connector 22 may be installed at an end of the suction tube 21 to prevent the suction tube 21 from being separated from the fastening portion 150, and the connector 22 may be inserted into the through-hole 155.

The second suction hole 159 may be additionally formed between the through-hole 155 and the first suction hole 157 extending in a straight line.

The second suction hole 159 may be formed between the through-hole 155 and the first suction hole 157 so as to be perpendicular to the through-hole 155 and the first suction hole 157, may pass through toward the lower molar seat 170, and may allow secretions sucked from the lower molar seat 170 to be discharged through the through-hole 155 and the fastening portion 150. That is, secretions sucked into the first suction hole 157 and the second suction hole 159 may be discharged through the fastening portion 150.

The sum of the inner diameters of the first suction hole 157 and the second suction hole 159 may be similar to the inner diameter of the suction tube 21, thereby maximizing the effect of suction. In the present disclosure, the sum of the inner diameters of the first suction hole 157 and the second suction hole 159 may fall within a range of 0.9 to 1.1 times the inner diameter of the suction tube 21. If the sum of the inner diameters of the first suction hole 157 and the second suction hole 159 is less than or exceeds the above-described range, the effect of suction is insufficient, and thus there is a concern that the effect of using the suction assisting device 10 may be deteriorated.

Meanwhile, the respective legs 200 may be configured to be formed at the lower portion of the body 100, more specifically, at the opposite sides of the lower portion of the body 100 so as to be respectively brought into intimate contact with opposite side surfaces of the lower molars seated on the lower molar seat 170.

Each of the legs 200 may be divided by partitions 210 arranged at a regular interval. In detail, the partitions 210 may include a first partition 211, a second partition 213, a third partition 215, and the fourth partition 217 that are arranged at a regular interval on the leg 200. The leg 200 may further include a first dividing portion 212 located between the first partition 211 and the second partition 213, a second dividing portion 214 located between the second partition 213 and the third partition 215, and a third dividing portion 216 located between the third partition 215 and a wing 230 which will be described later.

The second suction hole 159 may be configured to pass through the lower molar seat 170 located in the third dividing portion 216 so as to suck secretions, and the third dividing portion 216 may be configured with first protrusions 218 arranged at a regular interval.

The first protrusions 218 may be configured with a predetermined gap formed therebetween so that secretions are efficiently sucked into the second suction hole 159 through the gap.

The first dividing portion 212 and the second dividing portion 214 may be configured to be brought into intimate contact with side surfaces of the lower molars without having separate protrusions, and may have the effect of improving the function of fixing the suction assisting device 10 to the molars and maintaining airtightness of the third partition 215.

The leg 200 may further include patterns 250 formed at a regular interval on a lower end thereof, with a predetermined gap formed at a point brought into intimate contact with the skin in the oral cavity, so that when suction takes place from the fastening portion 150, secretions are sucked through the gap, thereby maximizing suction efficiency. Although it is illustrated that the patterns 250 are formed on the lower end of the leg 200 at positions only on lower ends of the first dividing portion 212, the second dividing portion 214, and the third dividing portion 216, a pattern 250 may also be formed on a lower end of the wing 230 formed near the third dividing portion 216.

Here, the third dividing portion 216 may be located between the third dividing portion 215 and the reference protrusion 218a, and the first protrusions 218 may be arranged at a regular interval in the third dividing portion 216. The reference protrusion 218a refers to a first protrusion 218 located on the boundary line between the leg 200 and the wing 230 when described with reference to FIG. 3.

In the present disclosure, the first protrusion 218 and the reference protrusion 218a have the same protrusion shape, and the reference protrusion 218a is merely a name designed to set the position of the third dividing portion 216. Therefore, it should be interpreted that the first protrusion 218 and the reference protrusion 218a have the same function and effect.

In addition, the leg 200 may further include the wing 230 extending from a side thereof, e.g., a point located on the right side (in FIG. 3) of the third dividing portion 216.

The wing 230 may be formed to extend from a side of each of the legs 200 formed at the opposite sides of the lower molar seat 170, so that a pair of wings 230 are formed. The wings 230 may be seated between ends of lower molars and the skin in the oral cavity, and may function to suck secretions that accumulate in a patient's throat.

Figure 1:
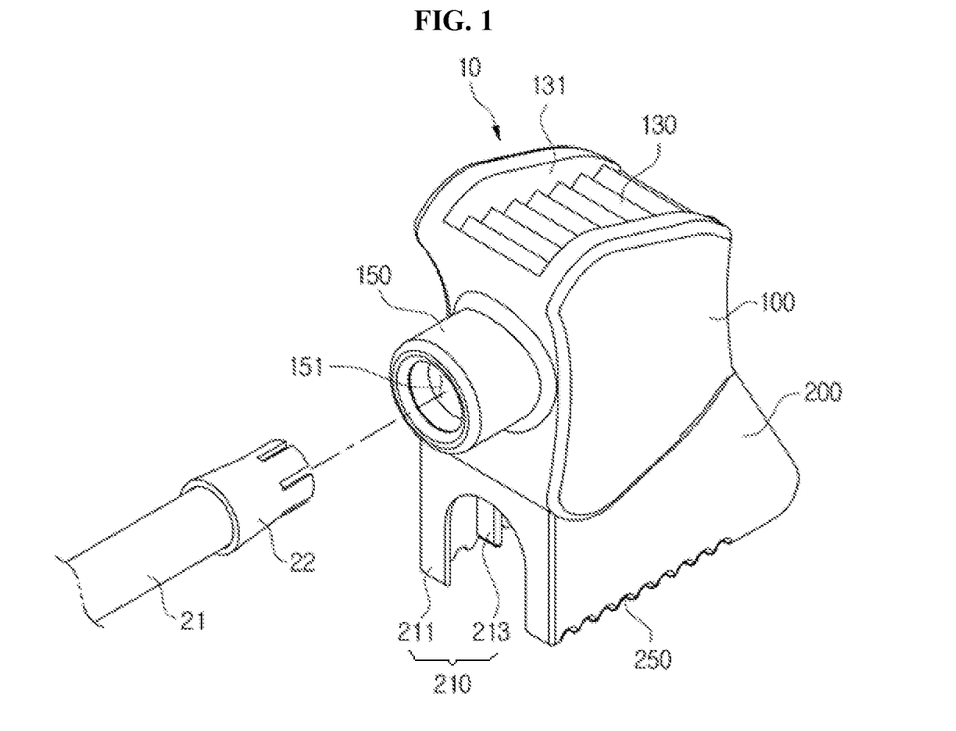
FIGS. 1 and 2 are perspective views illustrating a dental suction assisting device according to an embodiment of the present disclosure.
Figure 2:
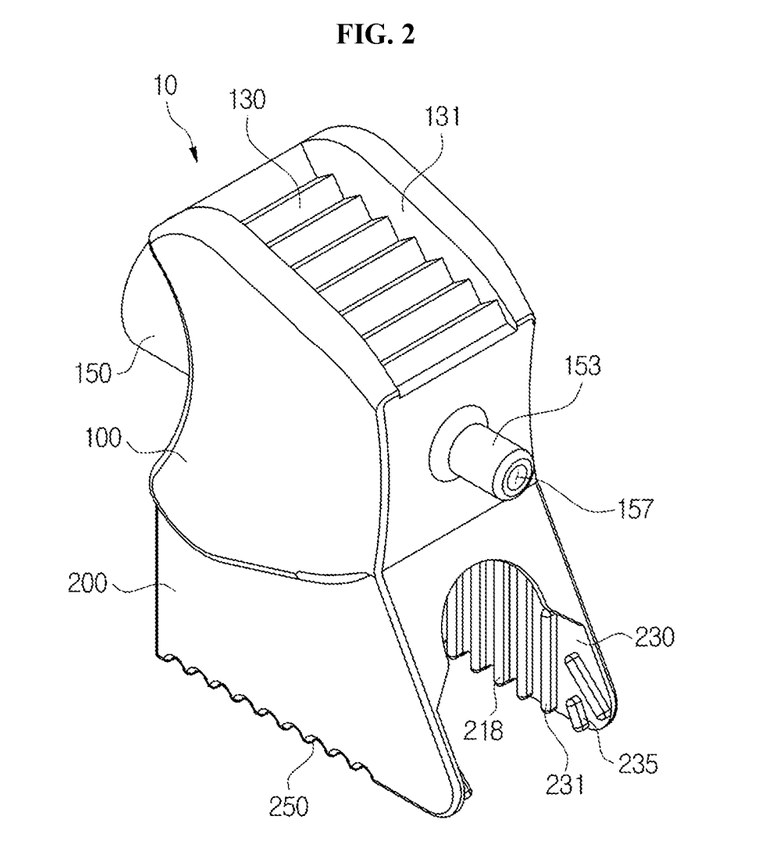
Figure 3:
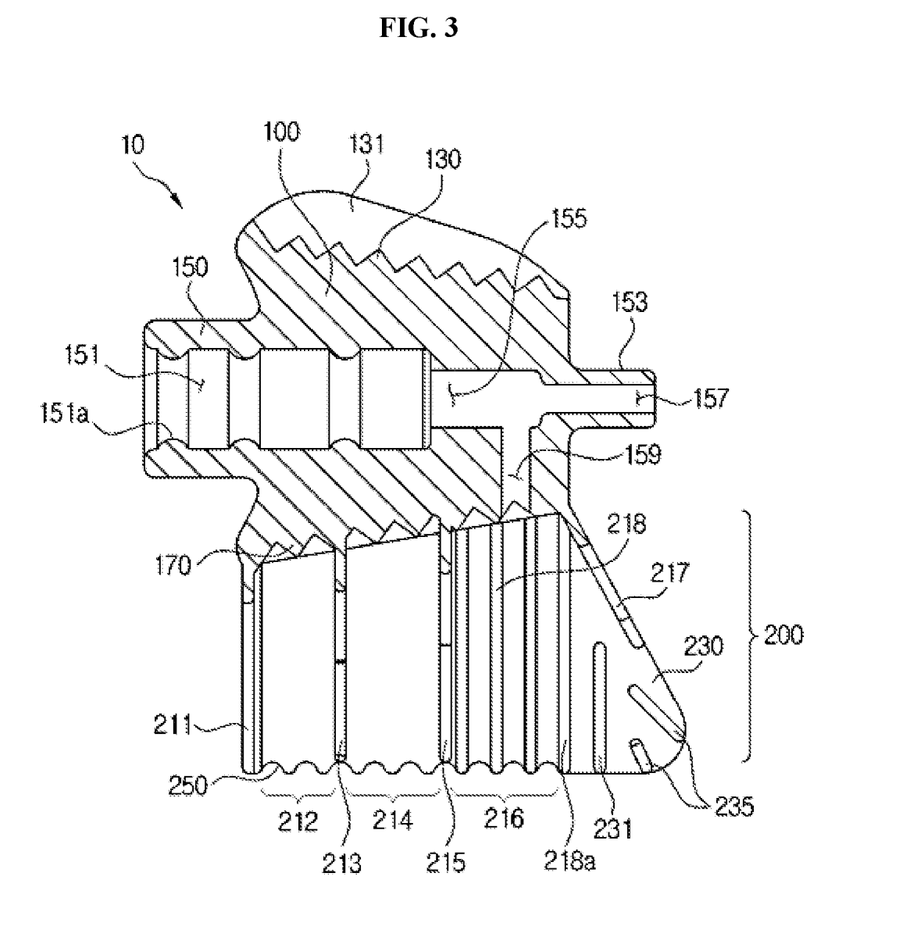
FIG. 3 is a sectional view illustrating the dental suction assisting device according to the embodiment of the present disclosure.
Figure 4:
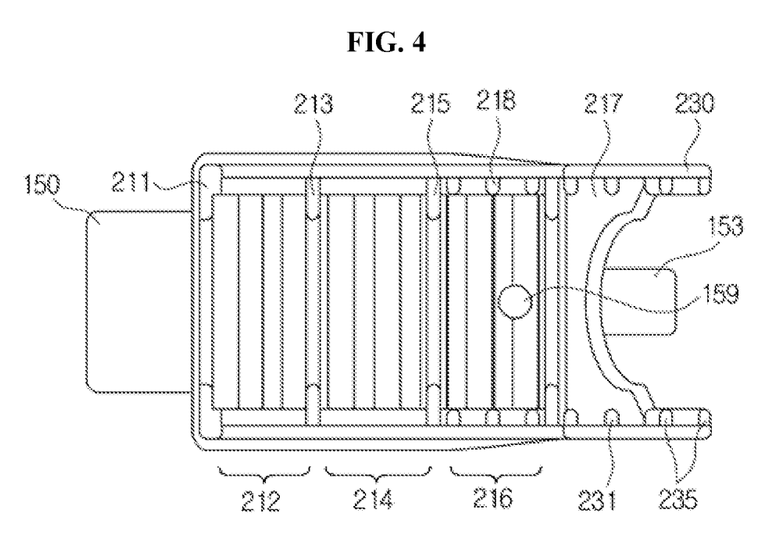
FIG. 4 is a rear view illustrating the dental suction assisting device according to the embodiment of the present disclosure.

Each of the wings 230 may be configured such that protrusions formed inwards are arranged at a regular interval with a gap formed between the protrusions, and this will be described with reference to FIG. 3.

In detail, the wing 230 may include a second protrusion 231 formed in the same direction as the partitions 210, and a third protrusion 235 formed at a corner of the wing 230.

In addition, a predetermined gap may be formed between the second protrusion 231 and the third protrusion 235 so that secretions are efficiently sucked through the gap.

In the present disclosure, although it is illustrated that one second protrusion 231 and two third protrusions 235 are formed, a protrusion may be additionally configured depending on the size of the suction assisting device 10.

As described above, according to the embodiment of the present disclosure, there is an advantage in that it is possible for the dentist to efficiently perform suction by fixing the suction assisting device 10 between the upper and lower molars of the patient and by connecting the suction tube 21 to the fastening portion 150, and in that it is possible for the dentist to perform dental treatment while simultaneously performing suction without the help of an assistant.

In addition, according to the embodiment of the present disclosure, the suction assisting device 10 is configured to allow suction in a state in which the suction assisting device 10 is fixed in the oral cavity of the patient while being held in hand of the dentist and then a suction device is inserted into the suction assisting device 10, and thus there is an advantage in that it is possible for the dentist to perform dental treatment without having to hold a separate suction device.

Although the exemplary embodiment of the present disclosure has been described in detail, this is for explaining the present disclosure in detail, and the dental suction assisting device according to the present disclosure should not be construed as being limited thereto. Also, the terms "comprise", "configure", and/or "have" specify the presence of stated components, unless there is a clearly different meaning in the present application, but do not preclude the presence thereof and should be construed to further include other components. Unless otherwise defined, all terms including technical and scientific terms used herein have the same meaning as commonly understood by one of ordinary skill in the art to which the present disclosure belongs.

Further, although the embodiment of the present disclosure has been described for illustrative purposes, those skilled in the art will appreciate that various modifications, additions and substitutions are possible, without departing from the scope and spirit of the present disclosure as disclosed in the accompanying claims. Therefore, the embodiment disclosed herein, therefore, is not to be taken in a sense for limiting the technical concept of the present disclosure but for explanation thereof, and the range of the technical concept is not limited to the embodiment. The scope of the present disclosure should be construed by the accompanying claims, along with the full range of equivalents to which such claims are entitled.

What is claimed is:

1. A dental suction assisting device, comprising:
   an upper molar seat located at an upper portion of a body made of a soft material, and having anti-separation protrusions arranged at a regular interval and a space for allowing seating of upper molars;
   a lower molar seat located at a lower portion of the body, and having anti-separation protrusions arranged at a regular interval and a space for allowing seating of lower molars;
   a fastening portion having an insertion hole and a through-hole formed between the upper molar seat and the lower molar seat, and protruding outward from a side of the insertion hole so as to allow fastening of a suction tube;
   a suction port formed at a position opposite to the fastening portion, having a first suction hole formed therein to be connected to the through-hole, and protruding outward so as to allow secretions including saliva secreted into an oral cavity to be sucked through the suction tube;
   a leg formed at each of opposite sides of the lower molar seat, and configured such that the respective legs are brought into intimate contact with opposite side surfaces of the lower molars, the leg having partitions arranged at a regular interval; and
   a wing extending from a side of the leg for allowing seating between the lower molars and skin in the oral cavity.

2. The dental suction assisting device of claim 1, further comprising:
   a support formed in a partition shape at each of opposite sides of the upper molar seat, and configured such that the respective supports are brought into intimate contact with opposite side surfaces of the upper molars thereby allowing the body to be fixed in place to the upper molars.

3. The dental suction assisting device of claim 1, further comprising:
   fixing protrusions arranged at a regular interval on an inner circumferential surface of the insertion hole so that the suction tube is inserted into the fastening portion even if a diameter of the suction tube varies,
   wherein at least two fixing protrusions are formed on the inner circumferential surface of the insertion hole.

4. The dental suction assisting device of claim 1, further comprising:
   a second suction hole formed between the through-hole and the first suction hole perpendicularly to the through-hole, and passing through toward the lower molar seat,
   wherein a sum of inner diameters of the first suction hole and the second suction hole falls within a range of 0.9 to 1.1 times an inner diameter of the suction tube.

5. The dental suction assisting device of claim 4, wherein the third dividing portion has first protrusions arranged at a regular interval; and
   when the secretions are sucked into the second suction hole, the secretions are sucked through a gap formed between the first protrusions.

6. The dental suction assisting device of claim 1, wherein the partitions comprise a first partition, a second partition, a third partition, and a fourth partition that are arranged at a regular interval on the leg; and
   the leg further comprises:
      a first dividing portion located between the first partition and the second partition;
      a second dividing portion located between the second partition and the third partition; and
      a third dividing portion located between the third partition and a reference protrusion.

7. The dental suction assisting device of claim 6, wherein the third dividing portion has first protrusions arranged at a regular interval; and
   wherein when the secretions are sucked into the second suction hole, the secretions are sucked through a gap formed between the first protrusions.

8. The dental suction assisting device of claim 1, wherein the wing comprises:
   a second protrusion formed in the same direction as the partitions; and
   a third protrusion formed at a corner of the wing; and
   a gap is formed between the second protrusion and the third protrusion, and the secretions are sucked through the gap.

9. The dental suction assisting device of claim 1, further comprising:
   patterns formed at a regular interval on a lower end of the leg, with a predetermined gap formed at a point brought into intimate contact with the skin in the oral cavity, and configured to maximize suction efficiency when suction takes place from the fastening portion.

\* \* \* \* \*